United States Patent
Schmidt et al.

(10) Patent No.: US 8,948,614 B1
(45) Date of Patent: Feb. 3, 2015

(54) PLUGGABLE PHOTONICS FOR COHERENT OPTICAL COMMUNICATION

(75) Inventors: Theodore John Schmidt, Gilroy, CA (US); Christian Malouin, San Jose, CA (US); Roberto Marcoccia, San Jose, CA (US); Steven Keck, Mountain View, CA (US); Bo Zhang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 380 days.

(21) Appl. No.: 13/434,532

(22) Filed: Mar. 29, 2012

(51) Int. Cl.
*H04B 10/61* (2013.01)

(52) U.S. Cl.
USPC .......................................................... 398/208

(58) Field of Classification Search
CPC ............. H04B 10/697–10/6973; H04B 10/616
USPC .......................................................... 398/208
See application file for complete search history.

(56) References Cited

U.S. PATENT DOCUMENTS

| 8,483,577 B2 * | 7/2013 | Mazzini et al. ............... 398/193 |
| 8,494,368 B2 * | 7/2013 | Xie et al. ........................ 398/81 |
| 2003/0198445 A1 * | 10/2003 | Inujima et al. ................. 385/92 |

OTHER PUBLICATIONS

Multisource Agreement for 100G Long-Haul DWDM Transmission Module—Electromechanical; Optical Internetworking Forum, Jun. 8, 2010 [online], [retrieved on Jun. 6, 2014]. Retrieved from the Internet <URL: http://www.oiforum.com/public/documents/OIF-MSA-100GLH-EM-01.0.pdf>.*

Berthold et. al., "100G Ultra Long Haul DWDM Framework Document," Optical Internetworking Forum (OIF), Accessed Feb. 1, 2012, 10 pp., Online: http://www.oiforum.com/public/documents/OIF-FD-100G-DWDM-01.0.pdf.

Gardner, "A BPSK/QPSK Timing-Error Detector for Sampled Receivers," IEEE Transactions on Communications, vol. Com-34, No. 5, May 1986, pp. 423-429.

* cited by examiner

*Primary Examiner* — Nathan Curs

(74) *Attorney, Agent, or Firm* — Shumaker & Sieffert, P.A.

(57) ABSTRACT

This disclosure describes techniques to utilize pluggable photonics module in high data rates optical communications systems such as some coherent optical communications system. The pluggable photonics module plugs into a host board. The host board includes a processor that compensates for distortion caused by data streams traveling across the pluggable interfaces that the pluggable photonics module and host board use to couple to one another.

26 Claims, 6 Drawing Sheets

PLUGGABLE PHOTONICS FOR COHERENT OPTICAL COMMUNICATION

TECHNICAL FIELD

This disclosure relates to optical communication, and more particularly, to coherent optical communication system.

BACKGROUND

Conventionally, optical communication systems operate in the 1 gigabit per second (Gbps) to 10 Gbps range. With the increase in the amount of data that needs to be communicated, optical communication systems that operate at even higher data rates are needed. For instance, some recent optical communication systems operate in the 100 Gbps range. Scaling to these types of high data rate optical communication systems present design challenges for maintaining signal integrity not only due to the higher bandwidth, but also due to the complex modulation formats.

SUMMARY

In general, this disclosure describes techniques to utilize pluggable photonics modules that are received by host boards in optical communication systems such as coherent optical communication systems. Coherent optical communication systems require transmission and reception of multiple electrical data streams between the pluggable photonics module and the host board. These electrical data streams together represent magnitude and phase information for an optical signal that is received or transmitted by the pluggable photonics modules.

A pluggable photonics module couples to the host board via connection points that reside on the pluggable photonics module and the host board. Any less than ideal coupling via the connection points may negatively impact the signal integrity of the signals received or transmitted by the host board. For example, in coherent optical communication systems, the host board receives a plurality of electrical data streams, from the pluggable photonics module, that together represent the magnitude and phase information of the optical signal received by the pluggable photonics module. As the electrical data streams travel across the connection points from the pluggable photonics module to the host board, there is possible degradation in the quality of the electrical signals, thereby making it difficult to recover the magnitude and phase information of the received optical signal.

As discussed in more detail, the host board includes a processor that compensates for the electrical distortion caused by the coupling through the connection points. For example, the processor modifies the pairs of data streams received through the connection points such that the modified data streams are similar to the data streams transmitted by the photonics module prior to the degradation through the connection points. As another example, the processor modifies a signal that is to be transmitted to the pluggable photonics module to compensate for the degradation that will be caused by the connection points. In this manner, the techniques allow for the pluggability of photonics modules for coherent optical communication systems, while minimizing signal degradation caused by the physical impairments of coupling though a pluggable module.

In one example, the disclosure describes a method that includes receiving, from a pluggable photonics module via a pluggable interface, a plurality of electrical data streams that together represent magnitude and phase information for a received optical signal in a coherent optical communication system, the electrical data streams having electrical distortion caused by the pluggable interface of the pluggable photonics module. The method also includes compensating for the electrical distortion on at least a pair of the electrical data streams together to recover the magnitude and phase information of the received optical signal.

In another example, the disclosure describes a processor that includes input units configured to receive, from a pluggable photonics module via a pluggable interface, a plurality of electrical data streams that together represent magnitude and phase information for a received optical signal in a coherent optical communication system, the electrical data streams having electrical distortion caused by the pluggable interface of the pluggable photonics module. The processor also includes a complex RX-equalizer configured to compensate for the electrical distortion on at least a pair of the electrical data streams together to recover the magnitude and phase information of the received optical signal.

In another example, the disclosure describes a host board that includes a pluggable interface configured to selectively couple the host board to or decouple the host board from a pluggable photonics module and receive, from the pluggable photonics module, a plurality of electrical data streams that together represent magnitude and phase information for a received optical signal in a coherent optical communication system. The host board also includes a processor configured to compensate for electrical distortion on at least a pair of the data streams together that is caused by at least the pluggable interface of the pluggable photonics module to recover the magnitude and phase information of the received optical signal.

In another example, the disclosure describes a method that includes receiving, with a pluggable photonics module, an optical signal in a coherent optical communication system, and converting, with the pluggable photonics module, the optical signal into a plurality of electrical data streams that together represent magnitude and phase information of the received optical signal. The method also includes transmitting, with the pluggable photonics module, the plurality of the electrical data streams across a pluggable interface that allows selective coupling of the pluggable photonics module to and decoupling of the pluggable photonics module from a host board.

In another example, the disclosure describes a pluggable photonics module that includes a pluggable interface and photonics. In the example, the pluggable interface is configured to allow selective coupling and decoupling of the pluggable photonics module and a host board. The photonics is configured to receive an optical signal in a coherent optical communication system, convert the optical signal into a plurality of electrical data streams that together represent magnitude and phase information of the received optical signal, and transmit the plurality of the electrical data streams across the pluggable interface to the host board.

In another example, the disclosure describes a network device that includes a pluggable photonics module and a host board. In this example, the pluggable photonics module includes a first pluggable interface configured to allow selective coupling and decoupling of the pluggable photonics module and the host board, and photonics configured to receive an optical signal in a coherent optical communication system, convert the optical signal into a plurality of electrical data streams that together represent magnitude and phase information of the received optical signal, and transmit the plurality of the electrical data streams across the pluggable interface to the host board. The host board includes a second pluggable interface configured to selectively couple the host board to or decouple the host board from the pluggable photonics module and receive the plurality of data streams from the pluggable photonics module, and a processor configured to compensate for electrical distortion on at least a pair of the data streams together that is caused by at least the first and second pluggable interfaces to recover the magnitude and phase information of the received optical signal.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
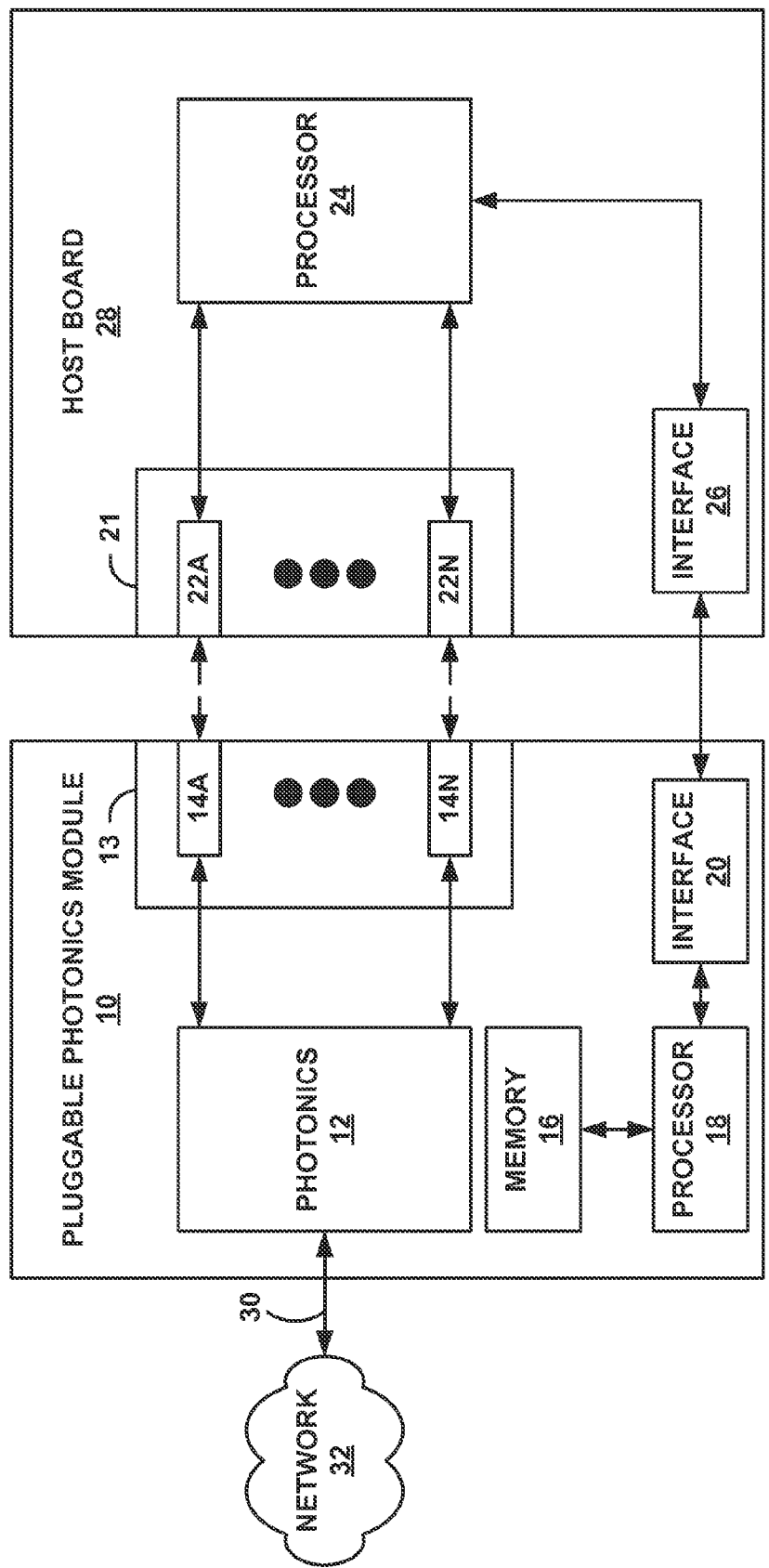
FIG. 1 is a block diagram illustrating a pluggable photonics module coupled to a host board in accordance with one or more examples described in this disclosure.

FIG. 1 is a block diagram illustrating pluggable photonics module 10 coupled to host board 28 in accordance with one or more examples described in this disclosure. The combination of pluggable photonics module 10 and host board 28 may be referred to as a network device. Host board 28 is referred to as a host board in that it "hosts" pluggable photonics module 10. That is, pluggable photonics module 10 may be a removable front end module that may be physically received by and removed from host board 28 operating as a back end module within a communication system or device. Pluggable photonics module 10 and host board 28 typically are components of an optical communication device or system (e.g., a network device) such as a wavelength-division multiplexing (WDM) system, including a dense wavelength division multiplexing (DWDM) system. For example, a WDM system may include a plurality of slots reserved for a plurality of boards, such as host board 28. Each host board 28 may receive one or more removable "pluggable" photonics module 10 to provide optical connectivity for one or more optical links 30. However, aspects of this disclosure are not limited to WDM systems. For purposes of illustration only and for ease of description, the examples are described in context of a WDM system.

In a WDM system, host board 28 or another board connected to host board 28 receives lower data rate optical or electrical signals from multiple devices such as switches or routers that host board 28 or the other board serializes together into higher data rate electrical signals. Pluggable photonics module 10 converts the electrical signals to an optical signal for further transmission into network 32 via optical link 30. Examples of network 32 include, but are not limited to, a wide area network (WAN) or the Internet.

In the reverse, pluggable photonics module 10 receives higher data rate optical signals via optical link 30 from network 32, and converts the optical signals to electrical signals. Host board 28 receives the electrical signals from pluggable photonics module 10, and host board 28 or the other board deserializes the electrical signals into a plurality of lower data rate optical or electrical signals for transmission to the routers and switches.

As the amount of data that needs to be transmitted to and received from network 32 increases, the data rate at which host board 28 needs to forward data to and from the routers and switches increases. For example, routers and switches are being designed to receive and transmit data at ever higher data rates, and the WDM systems need to scale to the higher data rates to keep pace with data rates from the routers and switches. For instance, it may have been sufficient for host board 28 and pluggable photonics module 10 to operate at approximately 10 gigabits per second (Gbps), but now need to operate at 100 Gbps.

Scaling from 10 Gbps to 100 Gbps presents several design and cost challenges. For example, 10 Gbps data rate is sufficiently slow to allow simple modulation schemes such as on-off keying (OOK), sometimes referred to as non-return-to-zero (NRZ) modulation. In OOK modulation, the presence of a carrier wave for a specific duration represents a binary one, and its absence for the same duration represents a binary zero. However, OOK modulation may not be suitable at 100 Gbps, and more complex modulation schemes may be necessary. For example, hardware components may not be able to process OOK modulated data at the relatively high rate of 100 Gbps.

In some examples, 100 Gbps may require phase-shift keying (PSK) such as quadrature phase-shift keying (QPSK), as one example, although other modulation schemes are possible such as binary phase-shift keying (BPSK), polarization multiplexed BPSK (PM-BPSK, polarization multiplexed QPSK (PM-QPSK), M-quadrature amplitude modulation (M-QAM) (where M>4), or PM-M-QAM. For purposes of illustration, the example techniques are described with respect to QPSK modulation, and in particular PM-QPSK modulation. However, aspects of this disclosure should not be considered so limiting. The techniques described in this disclosure are extendable to other modulation schemes such as those used for coherent optical communication systems. For instance, BPSK, PM-BPSK, QPSK, PM-QPSK, M-QAM, and PM-M-QAM modulation schemes may each require coherent optical detection, and pluggable photonics module 10 and host board 28 may be considered as being part of a coherent optical communication system.

Coherent optical communication systems refer to optical systems that utilize both magnitude and phase information for transmitting and receiving data such as for phase-shift keying modulation (e.g., BPSK, PM-BPSK, QPSK, PM-QPSK, M-QAM, or PM-M-QAM modulation). For example, in coherent optical communication systems, pluggable photonics module 10 may rely on a beating between a received signal and a local reference which maps both magnitude and phase information of the received optical electric field in the optical signal to measurable voltage or current. For instance, coherent optical communication systems may require using a local carrier phase reference generated at pluggable photonics module 10 for the reception of optical signals from network 32. For example, as illustrated in more detail with respect to FIGS. 2A and 2B, photonics 12 of pluggable photonics module 10 may include lasers and phase shifting optical hardware to mix pairs of data streams received from host board 28 for transmission as a single optical signal. Photonics 12 may also include the optical hybrid mixers to convert the received optical signal into the pairs (e.g., in-phase and quadrature phase) of data streams, referred to as I and Q data streams, for transmission to host board 28.

In PSK modulation, binary ones and zeros are represented by changing, or modulating, the phase of a carrier wave sometimes referred to as a lightwave. In this manner, both the magnitude and the phase of the optical signal are used to transmit data. For example, both the magnitude and the phase information of the received optical signal may be needed to recover the transmitted data.

In some examples, in addition, the modulated lightwave in one polarization may be multiplexed with another modulated polarization, which may be orthogonal to the previous one, to produce a polarization multiplexed (PM) signal, such as PM-QPSK. The polarizations of the lightwave signals may be chosen to be orthogonal to allow for a simple polarization beam splitter or polarizer for polarization demultiplexing when photonics 12 receives data from network 32.

In this way. PM-QPSK may be considered as a combination of two QPSK lightwave signals, where a first QPSK lightwave signal is for a first polarization of the lightwave, and the second QPSK lightwave signal is for a second polarization of the lightwave. Each of the QPSK lightwave signals utilizes four phases to encode two bits per symbol. Accordingly, PM-QPSK modulation utilizes four phases to encode two bits per symbol per polarization, which results in four bits per symbol.

For example, PM-QPSK modulation requires four input electrical data streams per polarization to impart the complex information on the optical carrier. The electrical signal for each polarization contains a pair of in-phase (I) and quadrature (Q) data streams that represent the complex data waveform. For example, in PM-QPSK modulation, there may be two in-phase data streams and two quadrature data streams, and one in-phase (I) data stream and one quadrature (Q) data stream forms one pair of a complex number, and the other I data stream and the other Q data stream forms another pair of a complex number. Each of the in-phase and quadrature data stream pairs may be nominally orthogonal to one another, in polarization, once the electrical data streams impart their complex information on the optical carrier. Each of these I or Q electrical data streams can be single-ended or differential. For OOK modulation, a single data stream is sufficient to impart the data on the lightwave, and similarly, a single data stream is sufficient to recover the data after detection by a photo-detector.

In other words, in PM-QPSK modulation, the input optical signal includes two lightwaves that are polarized orthogonally with respect to one another (e.g., one is horizontally polarized light, and the other is vertically polarized light, as an illustrative example). However, the polarization need not always be horizontal and vertical polarized light, and need not always be orthogonal. For ease of description, one of the lightwaves may be referred to as lightwave with polarization 1, and the other as lightwave with polarization 2. Each of the lightwaves may be associated with a particular magnitude and phase. The magnitude and phase of each of the lightwaves may be represented as a complex signal that includes real and imaginary aspects.

For example, for PM-QPSK modulation, photonics 12 receives an optical signal via optical link 30 that includes lightwave with polarization 1 and lightwave with polarization 2. Optical components within photonics 12 extract the lightwave with polarization 1 and the lightwave with polarization 2 from the received optical signal. The optical components further mix the lightwave with polarization 1 with a lightwave output from a local oscillator within photonics 12 to generate an in-phase optical data stream, referred to as $I_1$ to indicate that it is for the lightwave with polarization 1, and to generate a quadrature optical data stream, referred to as $Q_1$ to indicate that it is for the lightwave with polarization 1. The $I_1$ data stream is proportional to the real aspect of the complex signal of the lightwave with polarization 1, and the Qz data stream is proportional to the imaginary aspect of the complex signal of the lightwave with polarization 1.

Similarly, the optical components also mix the lightwave with polarization 2 with a lightwave output from a local oscillator within photonics 12 to generate an in-phase optical data stream, referred to as $I_2$ to indicate that it is for the lightwave with polarization 2, and to generate a quadrature optical data stream, referred to as $Q_2$ to indicate that it is for the lightwave with polarization 2. Similar to $I_1$ and $Q_1$, the $I_2$ data stream is proportional to the real aspect of the complex signal of the lightwave with polarization 2, and the $Q_2$ data stream is proportional to the imaginary aspect of the complex signal of the lightwave with polarization 2.

In this manner, the pairs of I/Q optical data streams (e.g., a first pair that includes $I_1$ and $Q_1$, and a second pair that includes $I_2$ and $Q_2$) together represent the received optical signal. For example, $I_1$ and $Q_1$ together represent the specific magnitude and phase of the lightwave with polarization 1, and $I_2$ and $Q_2$ together represent the specific magnitude and phase of the lightwave with polarization 2. Also, in this example, the lightwave with polarization 1 and the lightwave with polarization 2 together form the original received optical signal.

This relative increase in modulation complexity from a 10 Gbps data rate to a 100 Gbps data rate (e.g., from OOK modulation to QPSK modulation) presents a design challenge for scaling a WDM system from 10 Gbps to 100 Gbps. For example, additional care may need to be taken to maintain signal integrity because of the high data rate and the complex modulation. For instance, because PM-QPSK modulation results in a plurality of data streams (e.g., two pairs of I and Q data streams), with each pair representing both magnitude and phase information of the lightwave signal, care may need to be taken to ensure that the signal integrity for the pairs of data streams is maintained to properly recover both the magnitude and phase information of the received optical signal.

Such scaling may also increase cost. For example, the cost for photonics needed for 10 Gbps may be substantially less than the cost for photonics needed for 100 Gbps. Photonics, as used in this disclosure, refers commonly to the hardware components such as lasers and photodiodes needed for optical communication. For 100 Gbps with PM-QPSK modulation, the photonics include optical IQ modulators for each of the polarization multiplexed data streams to transmit data. To receive data, the photonics include optical hybrid mixers for each polarization state. Photonics for 10 Gbps with OOK modulation may not require such IQ modulators and optical hybrid mixers, and may therefore be less costly.

In other techniques, because of the plurality of data streams (e.g., four data streams for PM-QPSK modulation) and the high data rates of the 100 Gbps systems, designers typically reside photonics and data processing components such as analog-to-digital converters (ADCs) and digital-to-analog converters (DACs) on a common board. By placing photonics and ADCs and DACs on a common board, designers would feel satisfied that there will be minimal signal degradation between signals transmitted by the photonics to the data processing components or received by the photonics from the data processing components in 100 Gbps systems.

In these other examples where the photonics for 100 Gbps were not pluggable, because the components all resided on a common board, the owner of the WDM system may incur prohibitive costs in upgrading from a 10 Gbps WDM system to a 100 Gbps WDM system. For instance, one of the major costs in upgrading to a 100 Gbps WDM system is the cost of the photonics needed for 100 Gbps. Owners of WDM systems may find it desirable to pre-populate the slots within the WDM systems with boards, such as host board 28, that operate at 100 Gbps, but defer costs associated with the expensive photonics needed for 100 Gbps until truly necessary. However, in these other techniques, boards for 100 Gbps WDM systems included the photonics, which did not allow the owner to defer costs associated with photonics and resulted in a relatively large upfront cost for upgrading.

The techniques described in this disclosure provide for a scheme to allow the photonics for a relatively higher data rate WDM system (e.g., a 100 Gbps WDM system) to reside in a pluggable module, such as pluggable photonics module 10, rather than on host board 28. In this manner, photonics functions such as mixing of optical I and Q data stream pairs for PM-QPSK occur within pluggable photonics module 10, and other functions such as ADC, DAC and digital signal processing (DSP) functions occur on a different board such as host board 28 or another board coupled to host board 28 that is further downstream, rather than both functions occurring on a common board.

The pluggable design of pluggable photonics module 10 allows the owner to defer photonics costs. For example, the owner may pre-populate the 100 Gbps WDM system with a plurality of boards such as host board 28 for eventual upgrade to 100 Gbps. The cost of host board 28 may be substantially less than the cost of the photonics needed for 100 Gbps. Then, when 100 Gbps data rates are needed, the owner purchases a plurality of pluggable modules such as pluggable photonics module 10 and plugs each of these modules into respective ones of host board 28. In this manner, pluggable photonics module 10 provides the owner with a "pay as you grow" market strategy by differing costs associated with the 100 Gbps photonics until the growth requires it.

Also, using pluggable photonics module 10 provides the owner with vendor options. For example, one vendor may provide a better 100 Gbps version of pluggable photonics module 10 compared to another vendor, and the pluggable design of pluggable photonics module 10 allows the owner to select the better 100 Gbps version of pluggable photonics module 10. Moreover, the owner may not know ahead of time whether there will be further advances in photonics technology, or whether the 100 Gbps WDM system will be needed for special use cases. With the pluggable design, the owner may have flexibility in upgrading to better versions of pluggable photonics module 10, as well as flexibility in selecting the photonics module needed for the special use cases.

As illustrated, host board 28 includes pluggable interface 21 and pluggable photonics module 10 includes pluggable interface 13, which is the reciprocal of pluggable interface 21. Pluggable interface 13 and pluggable interface 21 mate with one another to couple pluggable photonics module 10 to host board 28. With pluggable interface 13 and pluggable interface 21, pluggable photonics module 10 can be selectively coupled to or decoupled from host board 28.

Pluggable interface 13 includes connection points 14A-14N (collectively referred to as "connection points 14") and pluggable interface 21 includes connection points 22A-22N (collectively referred to as "connection points 22"). When pluggable photonics module 10 couples to host board 28, connection points 14 mate with corresponding connection points 22 to provide a continuous electrical path for data transmission and reception between pluggable photonics module 10 and host board 28.

For example, photonics 12 of pluggable photonics module 10 receives a downstream optical signal from network 32 via optical link 30. In this example, the downstream optical signal is modulated in accordance with the PM-QPSK modulation scheme. Photonics 12 converts the downstream optical signal into two pairs of I and Q optical data streams, and converts the two pairs of I and Q optical data streams to two pairs of I and Q electrical data streams (referred to as pairs of I/Q electrical data streams for ease of reference). In this example, the pairs of I/Q electrical data streams together represent magnitude and phase information for the received optical signal. Photonics 12 transmits the pairs of I/Q electrical data streams to host board 28 via the electrical path provided by the mating of connection points 14 to connection points 22.

In the upstream, processor 24 transmits the pairs of I/Q electrical data streams to photonics 12 via the electrical path provided by the mating of connection points 22 to connection points 14. Photonics 12 receives the pairs of I/Q electrical data streams, and converts the pairs of I/Q electrical data streams into a single optical signal for upstream transmission to network 32 via optical link 30.

While pluggable photonics module 10 may provide cost deferment and design flexibility, the pluggable design may degrade the signal integrity of the pairs of I/Q electrical data streams received or transmitted by host board 28. For example, the mating of connection points 14 to connection points 22 may result in a less than ideal connection between pluggable photonics module 10 and host board 28, referred to as physical impairments of mating connection points 14 to connection points 22. For instance, connection points 14 and connection points 22 may not line up perfectly. Furthermore, even when connection points 14 and connection points 22 line up as close to ideal as possible, the connection between connection points 14 and connection points 22 may increase capacitance and inductance, as compared to if the components of pluggable photonics module 10 were directly coupled to the components of host board 28 (i.e., the components of pluggable photonics module 10 resided on host board 28).

These physical impairments negatively impact the signal integrity of the pairs of I/Q electrical data streams. For example, the physical impairments distort the pairs of I/Q electrical data streams transmitted by photonics 12. The increased capacitance and inductance may distort the amplitude of the pairs of the I/Q electrical data streams as a function of frequencies, as well as the phase (e.g., group delay as a function of frequency).

Because the pairs of I/Q electrical data streams transmitted by photonics 12 together represent the received optical signal, such distortions added by the physical impairments may make it difficult for processor 24 of host board 28 to accurately recover the magnitude and phase information of the received optical signal, and thereby increase the bit error rate (BER) to an undesirable level. For instance, in this example, the electrical data streams that processor 24 receives together represent the magnitude and phase information of the received optical signal. However, these electrical data streams also include electrical distortion caused by pluggable interface 13 and pluggable interface 21, which make it difficult for processor 24 to recover the magnitude and phase information of the received optical signal.

As described in more detail, in aspects of this disclosure processor 24 may compensate for the electrical distortion caused by pluggable interface 13 and pluggable interface 21 to recover the magnitude and phase information of the received optical signal. It should be understood that the recovered magnitude and phase information of the received optical signal may not be identical to the magnitude and phase information of the transmitted optical signal. For example, the received optical signal may also include optical distortion such as chromatic dispersion, as one non-limiting example. In examples described in this disclosure, processor 24 may also compensate for the optical distortion to recover magnitude and phase information of the original, transmitted optical signal.

For example, the optical signal that photonics 12 receives includes optical distortion. The optical components within photonics 12 extract the pairs of I and Q optical data streams. These extracted pairs of I and Q optical data streams may not be identical to the I and Q optical data streams that were mixed together for transmission to photonics 12 because of the optical distortion. After photonics 12 convert the pairs of I and Q optical data streams into pairs of I and Q electrical data streams, the pairs of I and Q electrical data streams represent the received optical signal, which included optical distortion. Then, when processor 24 receives the pairs of I and Q electrical data streams, these pairs of I and Q electrical data streams include both electrical distortion caused by pluggable interface 13 and pluggable interface 21 and optical distortion that was part of the received optical signal.

As described in more detail, processor 24 may compensate, on pairs of the I/Q electrical data streams, for the electrical distortion caused by pluggable interface 13 and pluggable interface 21 to recover the magnitude and phase information of the received optical signal. Processor 24 may also compensate for the optical distortion to recover the magnitude and phase information for the transmitted optical signal. In this manner, the I/Q electrical data streams may be substantially similar to the I/Q electrical data streams used to generate the transmitted optical signal.

For example, processor 24 includes one or more complex equalizers simultaneously compensating the amplitude (loss versus frequency) and the phase (group delay versus frequency) distortion due to physical impairments of the mating between pluggable interface 13 and pluggable interface 21. The term complex equalizers means that the equalizers operate on the real and imaginary parts of the complex signal. For example, for PM-QPSK, one equalizer may operate on the $I_1$ and $Q_1$ data streams together because $I_1$ represents the real aspect of the lightwave with polarization 1 and $Q_1$ represents the imaginary aspect of the lightwave with polarization 1. Another equalizer may operate on the $I_2$ and $Q_2$ data streams together because $I_2$ represents the real aspect of the lightwave with polarization 2 and $Q_2$ represents the imaginary aspect of the lightwave with polarization 2. In another example, a single equalizer may simultaneously compensate the amplitude and phase of both pairs of I/Q data streams.

Examples of processor 24 include, but are not limited to, a digital signal processor (DSP), a general purpose microprocessor, an application specific integrated circuit (ASIC), a field programmable logic array (FPGA), a combination thereof, or other equivalent integrated or discrete logic circuitry. In some examples, processor 24 may include other components for processing purposes such as ADCs and DACs, as further described below. Furthermore, although the one or more equalizers are described as being internal to processor 24, aspects of this disclosure are not so limited. These one or more equalizers may be external to processor 24. Accordingly, host board 28 may be considered as including the one or more equalizers.

The one or more equalizers receive distorted pairs of I/Q electrical data streams from pluggable photonics module 10 and modify the distorted pairs of I/Q electrical data streams to compensate for the distortion caused by the signal traveling across connection points 14 and connection points 22. The resulting modified pairs of I/Q electrical data streams may be substantially similar to the pairs of I/Q electrical data streams outputted by photonics 12.

The one or more equalizers may provide adaptive compensation, fixed compensation, or configurable compensation. For instance, the one or more equalizers may filter the received pairs of I/Q electrical data streams to compensate for the distortion. The filter shape for the equalizer filters may be adaptive, fixed, or configurable.

For adaptive impairment removal, the one or more equalizers estimate the amount of distortion caused by the physical impairment, and adapt the amount of compensation that is applied based on the estimated distortion. For fixed impairment removal, the one or more equalizers are preset with the amount of compensation, and provide the preset amount of compensation regardless of the amount of distortion.

In some examples, it may be possible to configure the amount of compensation that the one or more equalizers apply (i.e., configure the filter shape). For example, as illustrated in FIG. 1, pluggable photonics module 10 includes interface 20 and host board 28 includes interface 26. Interface 20 and interface 26 couple to one another when pluggable photonics module 10 couples to host board 28. When coupled, interface 20 transmits information to interface 26 regarding pluggable photonics module 10, which interface 26 forwards to processor 24. Based on the received information, processor 24 may configure the amount of compensation that the one or more equalizers apply.

For example, processor 24 may include a processing unit that receives the information from interface 20 via interface 26. The processing unit may utilize the received information to determine the amount of compensation that the one or more equalizers of processor 24 are to apply. In alternate examples, the processing unit may be external to processor 24. In these examples, the processing unit determines the amount of compensation that the one or more equalizers of processor 24 are to apply, and configures the one or more equalizers of processor 24 to apply the determined amount of compensation.

For instance, as illustrated, pluggable photonics module 10 includes memory 16 and processor 18. Examples of processor 18 include, but are not limited to, a DSP, a general purpose microprocessor, an ASIC, an FPGA, or other equivalent integrated or discrete logic circuitry. Examples of memory 16 include, but are not limited to, a random access memory (RAM), a read only memory (ROM), an electrically erasable programmable read-only memory (EEPROM), or other magnetic storage devices, flash memory, or any other medium that can be used to store information.

Memory 16 stores information about pluggable photonics module 10, and in some examples, information regarding the manner in which pluggable photonics module 10 will be used. The vendor of pluggable photonics module 10 may store such information in memory 16. In some examples, the vendor may also include information about the performance of pluggable photonics module 10, such as information that indicates that pluggable photonics module 10 includes low performance, low cost components, or low performance, low power components.

For example, memory 16 may store information regarding characteristics of the optical components of photonics 12, information regarding the type of modulation provided by photonics 12 (e.g., the type of QPSK or M-QAM modulation), information that provides an estimate of the amount of distortion caused by connection points 14 mating with connection points 22 (e.g., changes in magnitude and phase as a function of frequency), and any other type of information such as part number or vendor name pertinent to the functionality or behavior of pluggable photonics module 10 when coupled to host board 28. In some examples, processor 18 also transmits status information of pluggable photonics module 10. For example, if the components of photonics 12 are not functioning properly, processor 18 may transmit status information (e.g., an alarm) to processor 24 via interface 20 and interface 26.

When pluggable photonics module 10 is coupled to host board 28, processor 18 may retrieve the information stored in memory 16 and transmit the information to interface 20. Interface 20 converts the information received from processor 18 to a communication protocol for which interface 20 and interface 26 is configured. Processor 24 receives the information from interface 26 and determines the amount of compensation that the one or more equalizers should apply based at least on the received information.

Processor 24 may then configure the one or more equalizers to apply the determined amount of compensation. For example, based on information that indicates the changes in magnitude and phase, as a function of frequency, due to the pairs of I/Q electrical data streams traveling across pluggable interface 13 and pluggable interface 21 (e.g., across connection points 14 and connection points 22), processor 24 may determine the target filter shape that the one or more equalizers apply to compensate for the distortion. As another example, there may be a plurality of equalizer types from which processor 24 may select the equalizer that will compensate for the distortion. In this example, processor 24 may select the appropriate equalizer type based on the received information from processor 16.

In some examples, it may be sufficient for unidirectional communication from pluggable photonics module 10 to host board 28. However, aspects of this disclosure are not so limited, and host board 28 may transmit information to pluggable photonics module 10 for bi-directional communication. As one example, processor 24 transmits a command to processor 18, via interface 26 and interface 20, that defines the amplitude of the pairs of I/Q electrical data streams outputted by photonics 12. Processor 18, in turn, adjusts the amplitude of the pairs of I/Q electrical data streams outputted by photonics 12. As another example, processor 24 may determine that some tuning on the optical components of photonics 12 may result in better bit-error-rate (BER). In this example, processor 24 transmits a command to processor 18, via interface 26 and interface 20, that instructs processor 18 to tune the optical components of photonics 12, which processor 18 then tunes. There may be other examples of information that host board 28 and pluggable photonics module 10 communicate with one another, and the techniques should not be considered limited to the above examples.

Interface 20 and interface 26 communicate with another using any standard or proprietary protocol, and the techniques of this disclosure are not limited to any specific communication protocol. In general, the communication between interface 20 and interface 26 need not necessarily require complex communication formats or high data rate communication; although, this may be possible. As one example, interface 20 and interface 26 may communicate with one another using the management data input/output (MDIO) protocol. In this example, interface 20 and interface 26 are MDIO interfaces. For example, MDIO interface 20 couples to MDIO interface 26 with a serial bus and each transmits or receives information via the serial bus. MDIO communication is provided for illustration purposes only.

As described above, processor 24 includes one or more complex equalizers to compensate for the electrical distortion on the pairs of I/Q electrical data streams received from pluggable photonics module 10 to recover the magnitude and phase information of the received optical signal. These one or more equalizers are referred to as receiver (RX)-equalizers. In some examples, processor 24 may also include transmitter (TX)-equalizers that compensate the pairs of I/Q electrical data streams transmitted by processor 24.

For example, similar to the received pairs of I/Q electrical data streams, the data streams transmitted by processor 24 may be distorted due to the physical impairments of connection points 22 and connection points 14. To address this distortion, the one or more TX-equalizers modify the data streams transmitted by processor 24 before the signals travel across pluggable interface 21. For example, the one or more TX-equalizers modify the data streams to pre-compensate for the distortion such that after the physical impairments of connection points 22 and connection points 14 distort the pre-compensated data streams, the resulting data streams are substantially similar to the data streams transmitted by processor 24. Similar to the RX-equalizers, the TX-equalizers may be adaptive, fixed, or configurable.

Figure 2A:
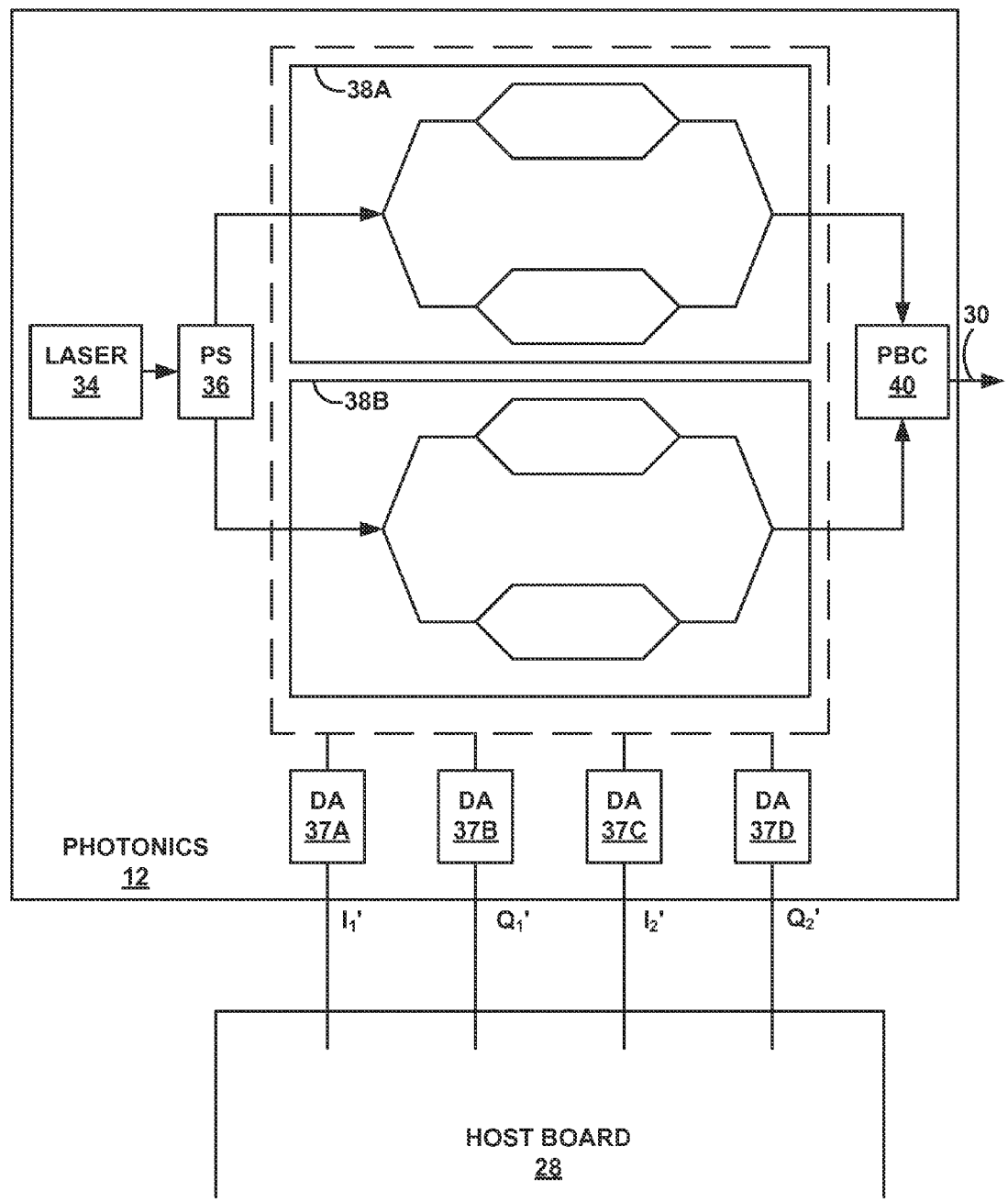
FIGS. 2A and 2B are block diagrams illustrating examples of photonics within a pluggable photonics module.
Figure 2B:
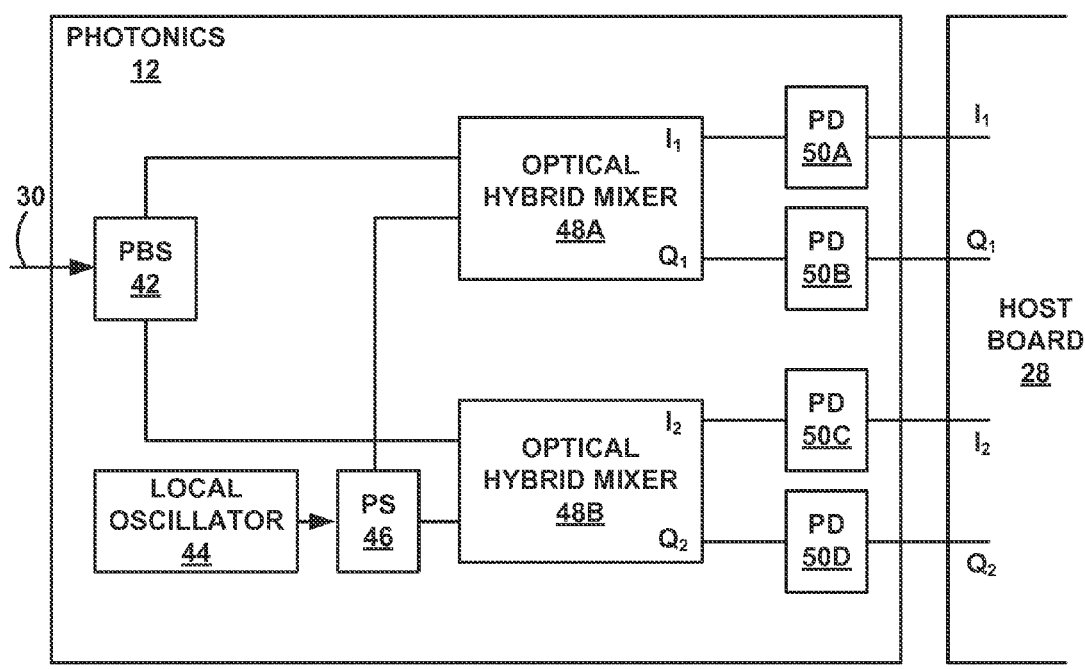

FIGS. 2A and 2B are block diagrams illustrating examples of photonics within a pluggable photonics module. For example, FIG. 2A illustrates components of photonics 12 that receive I/Q electrical data streams from processor 24, convert the I/Q electrical data streams into a QPSK modulated optical signal or PM-QPSK modulated optical signal, and transmit the optical signal to network 32. FIG. 2B illustrates components of photonics 12 that receive a QPSK or PM-QPSK optical signal from network 32, convert the optical signal into I/Q electrical data streams, and transmit the I/Q electrical data streams to processor 24. FIGS. 2A and 2B are illustrated separately for ease of description. However, it should be understood that photonics 12 includes both the transmit photonics illustrated in FIG. 2A and the receive photonics illustrated in FIG. 2B.

Furthermore, the components of photonics 12 are illustrated for PM-QPSK modulation. Photonics 12 may include additional, fewer, or different components than those illustrated based on the desired PM-QPSK modulation. In alternate examples, photonics 12 includes different components for different modulation schemes. For example, if BPSK modulation is desirable, photonics 12 includes components for coherent BPSK modulation. In general, photonics 12 includes components needed for the desired type of coherent communication, including even more complex modulation schemes such as multi-level quadrature amplitude modulation (M-QAM where M>4).

As illustrated in FIG. 2A, for the transmit photonics of photonics 12 include laser 34, polarization splitter (PS) 36, drive amplifiers 37A-37D, modulators 38A and 38B, and polarization beam combiner (PBC) 40. PBC 40 is coupled to optical link 30 and outputs an optical modulated signal (e.g., a PM-QPSK modulated optical signal). Also, as illustrated, photonics 12 receives $I_1'$, $Q_1'$, $I_2'$, and $Q_2'$ data streams, which are electrical data streams are outputted by processor 24 on host board 28 for PM-QPSK modulation.

In this disclosure, the terms $I_1'$, $Q_1'$, $I_2'$, and $Q_2'$ data streams are used to describe data streams that processor 24 transmits to pluggable photonics module 10, and the terms $I_1$, $Q_1$, $I_2$, and $Q_2$ data streams are used to describe data streams that processor 24 receives from pluggable photonics module 10. The $I_1'$, $Q_1'$, $I_2'$, and $Q_2'$ data streams that processor 24 transmits may be different from the $I_1$, $Q_1$, $I_2$, and $Q_2$ data streams that processor 24 receives. For example, the $I_1'$, $Q_1'$, $I_2'$, and $Q_2'$ data streams are for downstream communication, while the $I_1$, $Q_1$, $I_2$, and $Q_2$ data streams are for upstream communication.

In FIG. 2A, the $I_1'$ and $Q_1'$ data streams may form a first pair of data streams that processor 24 transmits, and may be for the lightwave with polarization 1. The $I_2'$ and $Q_2'$ data streams may form a second pair of data streams that processor 24 transmits, and may be for the lightwave with polarization 2. In some examples, the $I_1'$, $Q_1'$, $I_2'$, and $Q_2'$ data streams data streams may be composed of differential data streams that are AC coupled via capacitors to photonics 12.

In FIG. 2A, the components of photonics 12 receive the $I_1'$, $Q_1'$, $I_2'$, and $Q_2'$ data streams from connection points 14, which mates with connection points 22 of host board 28. In some examples, photonics 12 may include drive amplifiers 37A-37D coupled to each one of the $I_1'$, $Q_1'$, $I_2'$, and $Q_2'$ data streams. Drive amplifiers 37A-37D may amplify the voltage level of the $I_1'$, $Q_1'$, $I_2'$, and $Q_2'$ data streams outputted by host board 28.

Laser 34 may be any type of laser that is usable for high bit rate optical signal transmission, typically a low linewidth laser in the 1550 nm wavelength range (so-called C-Band), but can be any wavelength. Optical amplifiers operating in same wavelength range may allow photonics 12 to transmit the generated optical signal a relatively far distance. An example is Erbium-Doped Fiber Amplifiers (EDFAs), which amplify light in the 1550 nm spectral region. The ability of photonics 12 to transmit the generated optical signal a relatively far distance reduces the number of intermittent optical-to-electrical-to-optical (O-E-O) repeaters needed to regenerate the transmitted optical signal.

Polarization splitter (PS) 36 receives the light from laser 34 and splits the light into (at least) two paths. Each one of modulators 38A and 38B receives light from one of the paths. Modulators 38A and 38B modulate the light on the respective paths with respective I/Q electrical data stream pairs. Modulators 38A and 38B may be referred to as IQ modulators or Cartesian modulators. In the example of FIG. 2A, modulator 38A receives the $I_1'$ and $Q_1'$ electrical data streams and modulates the light to form a complex modulated lightwave signal, modulated in both magnitude and phase, forming a QPSK signal. Modulator 38B receives $I_2'$ and $Q_2'$ electrical data streams and modulates the light to form a complex modulated lightwave signal, modulated in both magnitude and phase, forming a second QPSK signal.

Polarization beam combiner (PBC) 40 receives the polarized and modulated optical signals from each one of modulator 38A and 38B. For instance, the optical QPSK signals from modulators 38A or 38B are then multiplexed in (nominally orthogonal) polarization using PBC 40. For example, PBC 40 combines the received QPSK optical signals into nominally orthogonal polarizations into a single polarization multiplexed (PM) optical signal and transmits the PM-QPSK optical signal to network 32 via optical link 30. In this manner, photonics 12 utilizes lightwave communications techniques to generate and transmit an optical PM-QPSK signal.

As illustrated in FIG. 2B, the receive photonics of photonics 12 include polarization beam splitter (PBS) 42, local oscillator (LO) 44, polarization splitter (PS) 46, optical hybrid mixers 48A and 48B, and photo-detectors (PDs) 50A-50D. PDs 50A-50D convert the magnitude of the optical signal to an electrical representation. PBS 42 receives an optical signal from network 32 via optical link 30 and splits the received optical signal into first and second optical signals with nominally orthogonal polarization (e.g., substantially orthogonal polarization). Each one of optical hybrid mixers 48A and 48B receive respective optical signals from the first and second nominally orthogonal optical signals from PBS 42.

The receive photonics also include local oscillator 44, which is a laser. Local oscillator 44 provides the phase reference required in coherent system to recover the PM-QPSK optical waveform that photonics 12 receives. In some examples, local oscillator 44 may be a free running oscillator. For example, the laser signal outputted by local oscillator 44 may not need to be phase-locked with the optical signal that PBS 42 receives.

Polarization splitter (PS) 46 receives the light from local oscillator 44 and splits the light into (at least) first and second light paths. PS 46 is substantially similar to PS 36 (FIG. 2A). Each one of optical hybrid mixers 48A and 48B receive respective local oscillator light from the first and second light paths from the PS 46. In some examples, the location of PBS 42 and PS 46 may be swapped with no loss of functionality, provided the light from local oscillator 44 is split into two nominally orthogonally polarized lightwaves.

Optical hybrid mixers 48A and 48B each mix the respective optical signals from PBS 42 with the respective local oscillator lightwave reference from PS 46 and output optical data stream representing in-phase (I) and quadrature-phase (Q) components of the PM-QPSK modulated signal. For example, optical hybrid mixer 48A outputs $I_1$ and $Q_1$ optical data streams. Optical hybrid mixer 48B outputs $I_2$ and $Q_2$ optical data streams. In some examples, optical hybrid mixers 48A and 48B may be 90 degree optical hybrid mixers. Also, in some examples, each one of the $I_1$, $Q_2$, $I_2$, and $Q_2$ optical data streams may be differentially encoded data streams.

Photo-detectors 50A-50D receive respective optical signals of the $I_1$, $Q_2$, $I_2$, and $Q_2$ optical data streams and convert these optical signals into electrical signals (e.g., the $I_1$, $Q_1$, $I_2$, and $Q_2$ data streams that processor 24 receives). Photo-detectors 50A-50D may be composed of a single photo-diode or a pair of nominally balanced photo-diodes. A transimpedence amplifier (TIA) element for each photo-detector may used to convert photo-current from the photo-diode(s) to a voltage representation. However, the inclusion of TIA elements may not be necessary in every example. The electrical output of each photo-detector in 50A-50D can be single-ended or differential electrical signals. In some examples, the TIA elements may include automatic gain control (AGC) amplifiers, or the AGC amplifiers may be external to the TIA elements. The AGC amplifiers may nominally maintain output electrical voltage amplitude/swing for varying input electrical current amplitude/swings.

In this manner, the receive photonics of photonics 12 convert the PM-QPSK modulated optical signal into electrical I and Q data stream pairs (e.g., the $I_1$, $Q_1$, $I_2$, and $Q_2$ data streams) representing the optical PM-QPSK signal for further processing by processor 24 of host board 28. For example, processor 24 receives the $I_1$, $Q_1$, $I_2$, and $Q_2$ electrical data stream pairs from photo-detectors 50A-50D through the mating between connection points 14 and connection points 22.

Figure 3:
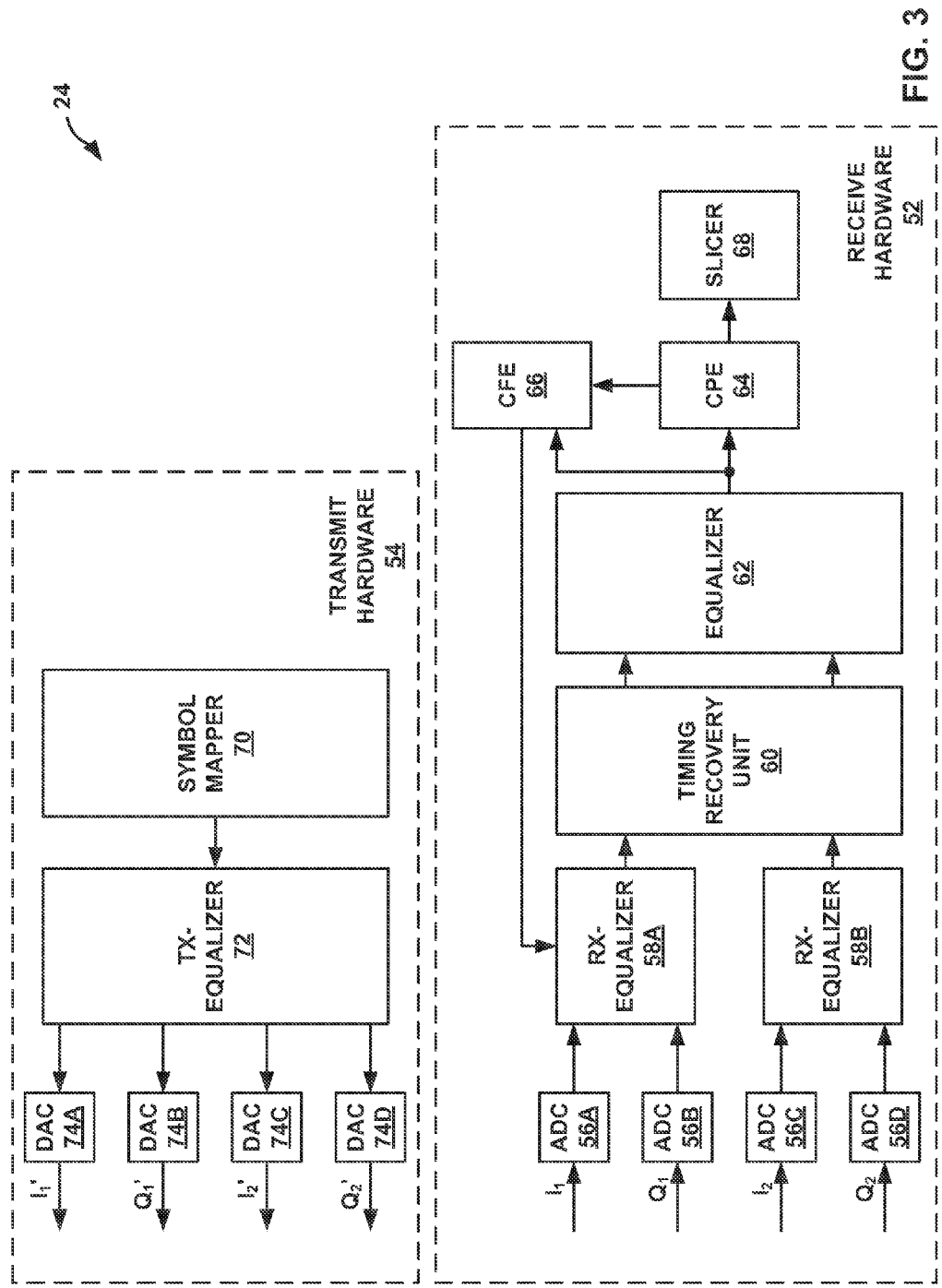
FIG. 3 is a block diagram illustrating an example of a processor of FIG. 1 in further detail.

FIG. 3 is a block diagram illustrating an example of processor 24 of FIG. 1 in further detail. Processor 24 may be referred to as a modulator-demodulator (modem). As illustrated, processor 24 includes receive hardware 52 and transmit hardware 54. For example, receive hardware 52 includes electric components for reception of the electrical I and Q data stream pairs across connection points 14 and connection points 22 from photonics 12, and transmit hardware 54 includes electric components for transmission of the electrical I' and Q' data stream pairs across connection points 22 and connection points 14 to photonics 12.

Processor 24 may include additional components than those illustrated in FIG. 3. For example, as described above, processor 24 of host board 28 and processor 18 of pluggable photonics module 10 may communicate information to one another. In some examples, processor 24 includes additional processing circuitry to effectuate such communication. For example, the additional processing circuitry may process the information received from processor 18 or information that is to be transmitted to processor 18. As another example, the processing circuitry may configure the illustrated components of processor 24. For instance, the processing circuitry may configure the illustrated components of processor 24 based on the received information from processor 18. The additional processing circuitry may be included within processor 24, or may be external to processor 24. For purposes of illustration only, the processing circuitry is described as being a part of processor 24.

Receive hardware 52 includes analog-to-digital converters (ADCs) 56A-56D, receiver (RX)-equalizers 58A and 58B, timing recovery unit 60, equalizer 62, carrier phase estimation (CPE) unit 64, carrier frequency estimation (CFE) unit 66, and slicer 68. The output of slicer 68 may be a relatively high data rate electrical data stream. Components such as a training deframer may receive the output of slicer 68. A forward-error correction (FEC) decoder, if FEC is utilized, may receive the output of the training deframer and may decode the electrical data stream for further transmission downstream (e.g., to the one or more switches and routers after deserialization). The training deframer and FEC decoder may be part of processor 24, or external to processor 24 and are not illustrated for purposes of clarity.

ADCs 56A-56D are input units of processor 24 that receive data streams via pluggable interface 13 and pluggable interface 21. For example, each of ADCs 56A-56D receive one of the analog $I_1$, $Q_2$, $I_2$, and $Q_2$ electrical data streams from pluggable photonics module 10 via pluggable interface 13 and pluggable interface 21, and convert the analog data streams into digital data streams. RX-equalizer 58A receives one pair of the I/Q digitized data streams (i.e., $I_1$ and $Q_1$ data streams), and RX-equalizer 58B receives another pair of the I/Q data streams (i.e., $I_2$ and $Q_2$ data streams). RX-equalizer 58A and RX-equalizer 58B implement a complex filter on received data streams to compensate for optical distortion that is represented electrically on the pairs of the I/Q digitized data streams.

In this example, the $I_1$ and $Q_1$ electrical data streams that RX-equalizer 58A receives together represent the magnitude and phase information of the lightwave with polarization 1 and include the electrical distortion caused by the pluggable interface 13 and pluggable interface 21. The $I_1$ electrical data stream is the in-phase data stream that represents the real aspect of the received lightwave with polarization 1, and the $Q_1$ electrical data stream represents the imaginary aspect of the received lightwave with polarization 1. Similarly, the $I_2$ electrical data stream is the in-phase data stream that represents the real aspect of the received lightwave with polarization 2, and the $Q_2$ electrical data stream represents the imaginary aspect of the received lightwave with polarization 1. In this manner, the $I_1$ and $Q_1$ electrical data streams may together represent any complex lightwave with polarization 1, and the $I_2$ and $Q_2$ electrical data streams may together represent any complex lightwave with polarization 2. The lightwaves with polarization 1 and polarization 2 may together be the original received lightwave.

RX-equalizer 58A implements a complex filter on a first pair of the data streams (e.g., the $I_1$ and $Q_1$ electrical data streams) to compensate for the electrical distortion caused by pluggable interface 13 and pluggable interface 21 (e.g., the distortion caused by the data streams traveling across connection points 14 and connection points 22). Similarly, RX-equalizer 58B implements a filter on a second pair of the data streams (e.g., the $I_2$ and $Q_2$ data streams) to compensate for the distortion caused by the data streams traveling across pluggable interface 13 and pluggable interface 21.

In this example, the filter that RX-equalizer 58A implements and the filter that RX-equalizer 58B implements are complex digital filters. Also, the filter shape of the digital filters may be adaptive, fixed, or configurable to provide adaptive, fixed, or configurable compensation that compensates for the distortion caused by the data streams traveling across pluggable interface 13 and pluggable interface 21. For example, RX-equalizers 58A and 58B may estimate the amount of distortion on the received respective data stream pairs and modify the filter shape to provide the appropriate compensation. As another example, RX-equalizers 58A and 58B may be preset with filter shape, and may provide fixed compensation in this case. As yet another example, RX-equalizers 58A and 58B may receive configuration information from processor 18 of pluggable photonics module 10 that indicates the desired filter shape. In this example, RX-equalizers 58A and 58B configure the respective filter shapes based on the received configuration information.

By filtering at least two of the data streams together, the techniques described in this disclosure may allow RX-equalizer 58A and 58B to minimize the distortion caused by the data streams traveling across pluggable interface 13 and pluggable interface 21. For example, as described above, the $I_1$ and the $Q_1$ electrical data streams together represent the magnitude and phase information of the lightwave with polarization 1. The $I_1$ electrical data stream may not, by itself, provide sufficient information to recover the magnitude and phase information of the lightwave with polarization 1, and the same may be true for the $Q_1$ electrical data stream. Therefore, compensating for $I_1$ and $Q_1$ individually may not be sufficient to recover the original received optical signal. For example, compensating for the electrical distortion on the $I_1$ data stream without using the $Q_1$ data stream, and vice-versa, would result in data streams that, although compensated for the electrical distortion, no longer represent the magnitude and phase information of the lightwave with polarization 1.

In the example techniques, RX-equalizer 58A compensates the $I_1$ electrical data stream to remove the electrical distortion based on the $Q_1$ electrical data stream so as to maintain the relationship between the $I_1$ and $Q_1$ data streams. Similarly, RX-equalizer 58A compensates the $Q_1$ electrical data stream to remove the electrical distortion based on the $I_1$ electrical data stream so as to maintain the relationship between the $I_1$ and $Q_1$ data streams. RX-equalizer 58B may function in a similar manner, but with respect to the $I_2$ and $Q_2$ data streams.

As indicated above, pluggable interface 13 and pluggable interface 21 may add additional capacitance and/or inductance to the pairs of the I/Q electrical data streams. These physical impairments may distort the signal across frequency and phase. For example, the physical impairments may distort the amplitude and shape of the pairs of I/Q electrical data streams. For instance, the electrical distortion may add peaking or ripples in the I/Q electrical data streams. RX-equalizer 58A and 58B may be configured to compensate for the amplitude and shape distortion. The phase distortion may be that different frequencies of the I/Q electrical data streams travel at different rates. For example, the pairs of I/Q electrical data streams may have signal power at different frequencies, and the delay of the signal components at these frequencies may be different. This type of delay is commonly referred to as group delay. In some examples, RX-equalizer 58A and 58B may be configured to compensate for the group delay on the pairs of the I/Q electrical data streams.

In some examples, RX-equalizer 58A and RX-equalizer 58B may be formed in single 2×2 complex multiple-input-multiple-output (MIMO) equalizer, such as the equalizer 62 in receive hardware 52. This 2×2 complex RX-equalizer may compensate for the distortion on at least two pair of the received data streams simultaneously. In some instances, such a common RX-equalizer may be a relatively large equalizer that consumes most of the real estate available on processor 24, as compared to two 1×1 complex equalizers (i.e., RX-equalizer 58A and RX-equalizer 58B). For real estate management, processor 24 may include RX-equalizer 58A and RX-equalizer 58B, in addition to a smaller 2×2 complex equalizer 62, as illustrated in FIG. 3.

RX-equalizer 58A and RX-equalizer 58B may perform additional equalization. For instance, if photonics 12 receives an optical signal in a long haul application (e.g., from a transmitter that is many miles away), the data streams received by host board 28 may suffer from chromatic dispersion. This chromatic dispersion is an example of optical distortion that is part of the received optical signal. To address this, RX-equalizer 58A and RX-equalizer 58B may also compensate for the chromatic dispersion on the pairs of I/Q electrical data streams.

For example, after compensating for the electrical distortion, RX-equalizer 58A and 58B, processor 24, or some other unit, may be able to recover the magnitude and phase information of the received optical signal. However, the received optical signal may include optical distortion which is represented electrically in the pairs of I/Q electrical data streams. For example, the optical distortion may carry through the extraction of the pairs of the I and Q optical data streams, and the optical-to-electrical conversion. RX-equalizer 58A and 58B may also compensate for the optical distortion, which is represented electrically, in the pairs of the I/Q electrical data streams. In this manner, the output of RX-equalizer 58A and 58B are pairs of the I/Q electrical data streams that substantially similar to the pairs of the I/Q electrical data streams used to generate the optical signal that is received by photonics 12 (e.g., the transmitted optical signal that is received by photonics 12).

In some examples, the compensation for the electrical distortion caused by the data streams traveling across pluggable interface 13 and pluggable interface 21 may be separated from the optical distortion compensation provided by RX-equalizer 58A and RX-equalizer 58B. For example, each one of RX-equalizer 58A and RX-equalizer 58B may include an impairment removal unit and a chromatic dispersion compensation unit. The impairment removal unit compensates for the electrical distortion caused by the data streams traveling across pluggable interface 13 and pluggable interface 21, and the chromatic dispersion compensation unit compensates for the optical distortion (e.g., the chromatic dispersion).

In this example, receive hardware 52 includes a first impairment removal unit that receives the $I_1$ and $Q_2$ data streams from ADC's 56A and 56B, and outputs a distortion compensated $I_1$ and $Q_1$ data streams to a first chromatic dispersion compensation unit for chromatic dispersion compensation. Similarly, receive hardware 52 includes a second impairment removal unit that receives the $I_2$ and $Q_2$ data streams from ADCs 56C and 56D, and outputs a distortion compensated $I_2$ and $Q_2$ data streams to a second chromatic dispersion compensation unit for chromatic dispersion compensation. In this example, RX-equalizer 58A includes the first impairment removal unit and the first chromatic dispersion compensation unit, and RX-equalizer 58B includes the second impairment removal unit and the second chromatic dispersion compensation unit.

Timing recovery unit 60 receives data streams from RX-equalizer 58A and RX-equalizer 58B and performs timing recovery. For example, timing recovery unit 30 performs symbol timing utilizing interpolation and Timing Error Detector (TED) to achieve symbol timing recovery, although other timing recovery techniques are possible. One example of the timing recovery technique is described in F. M. Gardner. "BPSK/QPSK Timing-Error Detector for Sampled Receivers," IEEE Transactions on Communications, vol. COM-34, No. 5, May 1986, and is incorporated by reference in its entirety. The sampling frequency locked clock, generated by timing recovery unit 60, may provide the clock signal for components of processor 24 or for other components on host board 28.

Equalizer 62 receives the data streams from timing recovery unit 60 and performs any other compensations. For example, RX-equalizer 58A and RX-equalizer 58B may not be able to compensate for all of the chromatic dispersion, and equalizer 62 may compensate for any remaining chromatic dispersion. In addition, equalizer 62 may un-mix the polarization of the received data streams. For example, equalizer 62 may compensate for any polarization mixing in optical link 30 (e.g., mixing between the lightwave with polarization 1 and the lightwave with polarization 2). Furthermore, equalizer 62 may perform any residual compensation for the distortion induced by pluggable interface 13 and pluggable interface 21.

Carrier phase estimation unit (CPE) 64 and carrier frequency estimation unit (CFE) 66 fix the phase and the frequency offset (between the signal and the local oscillator) of the data stream. For example, as described above with respect to FIG. 2B, local oscillator 44 may be a free-running oscillator. Because local oscillator 44 may be a free-running oscillator, the $I_1$ and $Q_1$ data streams may be orthogonal to one another, and the $I_2$ and $Q_2$ data streams may be orthogonal to one another, however, the phases of each of these data streams may not be fixed. CPE 64 and CFE 66 function in feedback to estimate the relative frequency and phase between the received signal and local oscillator 44 to track the phase of the data streams. Slicer 68 receives the data streams from CPE 64 and digitizes to binary sequences the data streams for further transmission to other components within processor 24 or other components on host board 28.

As illustrated in FIG. 3, transmit hardware 54 includes symbol mapper 70, transmitter (TX)-equalizer 72, and digital-to-analog converters (DACs) 74A-74D. DACs 74A-74D receive digital pairs of I' and Q' data streams from TX-equalizer 72 and convert the digital data streams into analog data streams for transmission to pluggable photonics module 10. Again, in this disclosure I' and Q' refer to data streams that processor 24 transmits and may be different from the I and Q data streams, which refer to the data streams that processor 24 receives.

In FIG. 3, DACs 74A-74D are output units of processor 24 that transmit data streams to photonics 12 via pluggable interface 21 and pluggable interface 13. Symbol mapper 70 may receive a forward-error correction (FEC) encoded data stream that has been framed by a training framer. Symbol mapper 70 may map the received encoded data stream to the symbols for the desired modulation. For example, symbol mapper 70 may map the encoded data stream to the symbols for PM-QPSK modulation to generate the pairs of I' and Q' data streams.

TX-equalizer 72 receives the pairs of I' and Q' data streams and pre-compensates the data streams. For example, similar to RX-equalizer 58A and RX-equalizer 58B, TX-equalizer 72 may operate on pairs of data streams and may implement an adaptive, fixed, or configurable filter. However, the filter that TX-equalizer 72 implements pre-compensates for the electrical distortion that will be caused by the data streams traveling across pluggable interface 21 and pluggable interface 13. In this manner, the amplitude and phase relationship between the data streams that photonics 12 receives is accurate because the pre-compensation compensated for the distortion caused by the data streams traveling across pluggable interface 21 and pluggable interface 13.

As described above, processor 24 of host board 28 and processor 18 of pluggable photonics module 10 may transmit and receive information from one another via interface 26 and interface 20. In some examples, processor 24 may also transmit information to processor 18 that causes processor 18 to tune one or more components within photonics 12. As one example, processor 24 may transmit information to processor 18 to instruct processor 18 to adjust the output voltage swing from photo-detectors 50A-50D, or the transimpedance amplifiers coupled to the photo-detectors. Such adjustment may optimize the input to ADCs 56A-56D for system performance. For example, the processing circuitry, described above, may determine that the voltage swing is not sufficient or is too high, and in response may indicate to processor 18 to increase or decrease (as applicable) the voltage swing to the desired level.

As another example, the processing circuitry of processor 24 may transmit instructions to processor 18 to adjust the frequency and/or power of local oscillator 44 to optimize system performance. As yet another example, photonics 12 may include drive amplifiers 37A-37D that amplify the voltage level of the electrical $I_1'$, $Q_1'$, $I_2'$, and $Q_2'$ data streams driving the optical modulators 38A and 38B. In these examples, the processing circuitry of processor 24 may transmit information to processor 18 to adjust the amount by which at least one of the drive amplifiers amplify the voltage level of the $I_1'$, $Q_1'$, $I_2'$, and $Q_2'$ electrical data streams. For example, the processing unit may adjust the amount of amplification of at least one of the drive amplifiers 37A-37D based on the output level of TX-equalizer 72. It may be possible for the processing unit to transmit information to processor 18 instructing processor 18 to adjust the amplification of one of driver amplifiers 37A-37D differently than another one of driver amplifiers 37A-37D.

The processing circuitry may transmit information to processor 18 instructing processor 18 to tune the components within photonics 12 in a continuous or static manner. For example, the processing circuitry may continuously monitor the performance of processor 24, and may in feedback transmit information to processor 18 to tune the components of photonics 12 (e.g., the example manners described above). Alternatively, the processing unit may instruct processor 18 to tune the components of photonics 12 once or periodically. When instructing processor 18 to tune the components periodically, the processing unit may not monitor the performance of processor 24.

Figure 4:
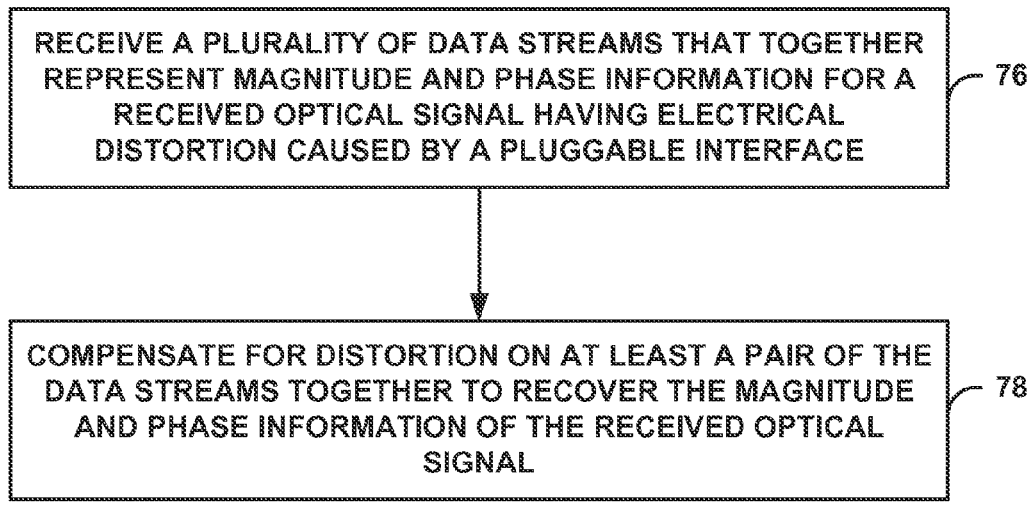
FIG. 4 is a flowchart illustrating an example technique in accordance with one or more aspects of this disclosure.

FIG. 4 is a flowchart illustrating an example technique in accordance with one or more aspects of this disclosure. For example, the technique illustrated in FIG. 4 may be applicable to host board 28 and to processor 24. For purposes of illustration only, reference is made to FIGS. 1 and 3.

Host board 28, and in the example of FIG. 3, processor 24 of host board 28 receives, from pluggable photonics module 10 via pluggable interface 21, a plurality of electrical data streams (e.g., $I_1$, $Q_1$, $I_2$, and $Q_2$) that together represent magnitude and phase information for a received optical signal (e.g., the optical signal received by photonics 12) in a coherent optical communication system, the electrical data streams having electrical distortion caused by pluggable interface 21 and pluggable interface 13 (76). In this example, the plurality of data streams carry both magnitude and phase information of the optical signal that pluggable photonics module 10 received and that is modulated in accordance with coherent optical communication systems. For example, the coherent optical communication system may require PM-QPSK modulation, and the data streams may be pairs of in-phase and quadrature data streams. However, modulation schemes other than PM-QPSK modulation such as BPSK and mQAM, as examples, are possible.

Processor 24, on host board 28, compensates for the electrical distortion on at least a pair of the electrical data streams together to recover the magnitude and phase information of the received optical signal (78). For example, as illustrated in FIG. 3, processor 24 includes RX-equalizer 58A which receives a pair of I and Q data streams (e.g., $I_1$ and $Q_1$). In this example, RX-equalizer 58A compensates for the distortion on the $I_1$ and $Q_1$ data streams together that is caused by the data streams traveling across pluggable interface 21 (e.g., compensates based on one another).

As discussed above, by compensating the distortion on the pairs of the I and Q data streams together, RX-equalizer 58A may be able to recover the magnitude and phase information for the lightwave with polarization 1 because the $I_1$ and $Q_1$ data streams together provide the magnitude and phase information for the lightwave with polarization 1. By compensating only one, or not compensating them together, in-phase and quadrature phase relationship between the $I_1$ and $Q_1$ data streams may be lost. By compensating for the electrical distortion on the $I_1$ and $Q_1$ data streams together, the in-phase and quadrature phase relationship of the $I_1$ and $Q_1$ data streams to the lightwave with polarization 1 may be maintained, making it possible to recover the magnitude and phase information of the received lightwave with polarization 1. Also, processor 24 includes RX-equalizer 58B that performs functions similar to those of RX-equalizer 58A, but with respect to a second pair of data streams (i.e., $I_2$ and $Q_2$ data streams), and for a lightwave with polarization 2.

There may be various ways in which processor 24 compensates for the electrical distortion. As one example, processor 24 receives configuration information from pluggable photonics module 10. Examples of this information may be part number or vendor information of pluggable photonics module 10, type of modulation provided by photonics 12, and/or information that provides an estimate of the amount of distortion caused by the pluggable interfaces. From the received information, processor 24 determines an amount of compensation to be applied.

For example, assume the received information is the part number of pluggable photonics module 10, in this example, processor 24 accesses to a look-up table that is stored internally to processor 24 or externally to processor 24. The look-up table provides distortion information for different types of pluggable photonics module 10, from which processor 24 retrieves the distortion information for the currently plugged pluggable photonics module 10. As another example, processor 24 directly receives distortion information from pluggable photonics module 10 that indicates the distortion information for the currently plugged pluggable photonics module 10. In this example, processor 24 may not need to access a look-up table.

RX-equalizers 58A and 58B apply compensation on respective pairs of data streams based on the determined amount of compensation. For example, processor 24 or RX-equalizers 58A and 58B may configure the filter shape that RX-equalizers 58A and 58B use to compensate for the distortion. In this example, RX-equalizers 58A and 58B configure the filter shape based on the determined amount of compensation that is to be applied. In this manner, RX-equalizers 58A and 58B may apply configurable amounts of compensation.

Alternatively, RX-equalizers 58A and 58B may provide fixed or adaptive amounts of compensation. For fixed compensation, RX-equalizers 58A and 58B may be preset with the amount of compensation to apply regardless of the amount of distortion. For adaptive compensation, RX-equalizers 58A and 58B may estimate the amount of distortion on the pairs of data streams, and compensate for the distortion based on the estimated amount of distortion. In this example, processor 24 may not need to receive information from pluggable photonics module 10 that processor 24 uses to determine the amount of distortion. Rather, processor 24 is configured to estimate the distortion.

Figure 5:
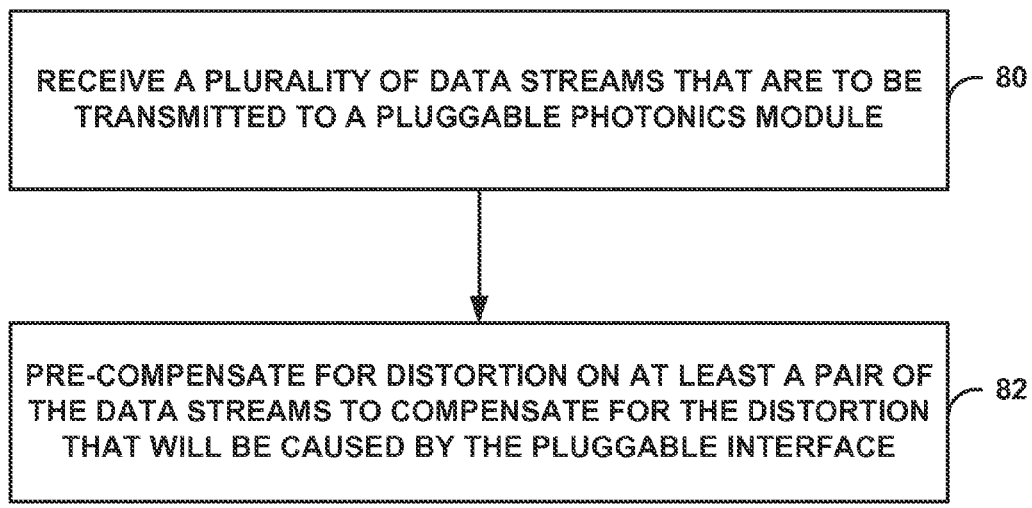
FIG. 5 is a flowchart illustrating another example technique in accordance with one or more aspects of this disclosure.

FIG. 5 is a flowchart illustrating another example technique in accordance with one or more aspects of this disclosure. For example, the technique illustrated in FIG. 5 may be applicable to host board 28 and to processor 24. For purposes of illustration only, reference is made to FIGS. 1 and 3.

TX-equalizer 72 receives a plurality of data streams that are to be transmitted to pluggable photonics module 10 (80). For example, TX-equalizer 72 receives pairs of in-phase and quadrature data streams. TX-equalizer 72 pre-compensates on at least a pair of the data streams to compensate for the distortion that will be caused by at least pluggable interface 21 (82).

Figure 6:
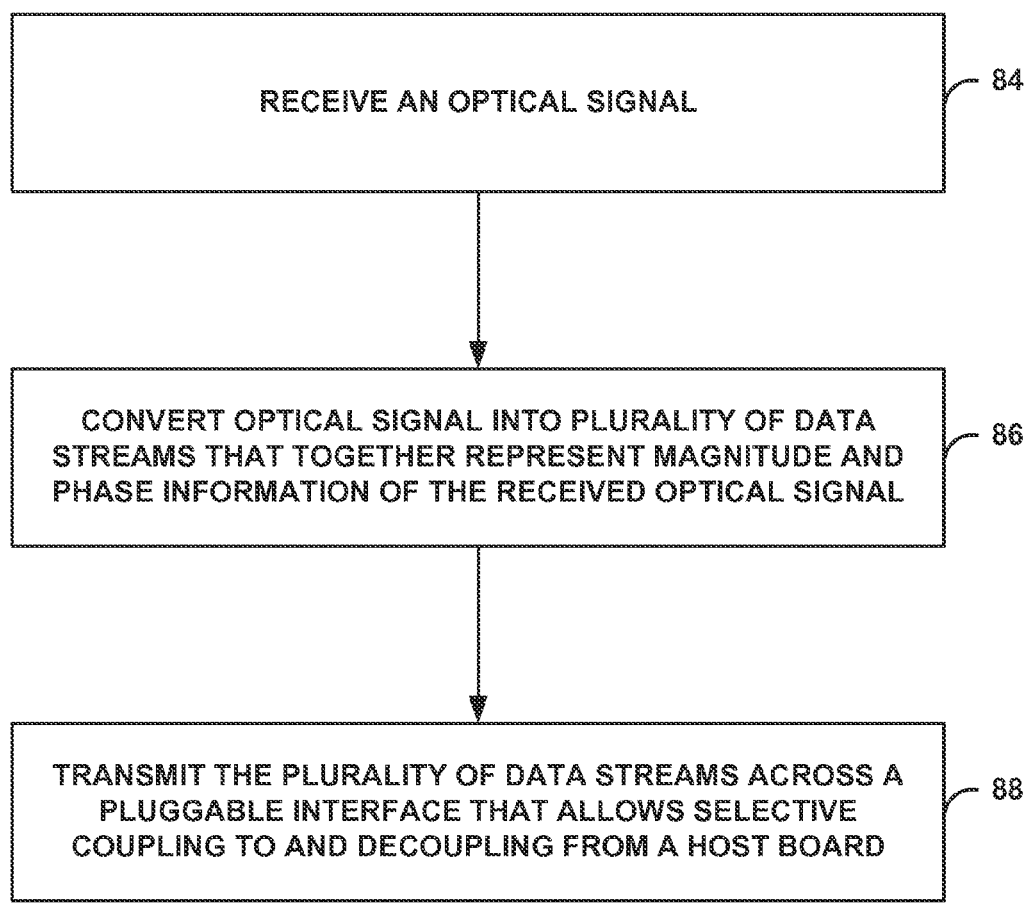
FIG. 6 is a flowchart illustrating another example technique in accordance with one or more aspects of this disclosure.

FIG. 6 is a flowchart illustrating another example technique in accordance with one or more aspects of this disclosure. For example, the technique of FIG. 6 may be applicable to pluggable photonics module 10. For purposes of illustration only, reference is made to FIG. 1.

Photonics 12 of pluggable photonics module 10 receives an optical signal from network 32 via optical link 30 (84). Photonics 12 converts the optical signal into a plurality of data streams that together represent magnitude and phase information of the received optical signal (86). Photonics 12 transmits the plurality of data streams across pluggable interface 13 that allows selective coupling and decoupling of pluggable photonics module 10 from host board 28 (88).

The techniques of this disclosure may be implemented in a wide variety of devices or apparatuses, including line-cards, routers, optical interfaces, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

The invention claimed is:

1. A method comprising:
receiving, from a pluggable photonics module via a pluggable interface, a plurality of electrical data streams that together represent magnitude and phase information for a received optical signal in a coherent optical communication system, the electrical data streams having electrical distortion caused by the pluggable interface of the pluggable photonics module;
compensating for the electrical distortion on a first electrical data stream of a pair of the electrical data streams based on a second electrical data stream of the pair of the electrical data streams;
compensating for the electrical distortion on the second electrical data stream of the pair of the electrical data streams based on the first electrical data stream of the pair of the electrical data streams; and
recovering the magnitude and phase information of the received optical signal from the electrical distortion compensated first and second electrical data streams.

2. The method of claim 1,
wherein the received optical signal comprises a lightwave with a first polarization and a lightwave with a second polarization,
wherein the first electrical data stream comprises an in-phase electrical data stream that represents a first aspect of the lightwave with the first polarization,
wherein the second electrical data stream comprises a quadrature electrical data stream that represents a second aspect of the lightwave with the first polarization,
wherein compensating for the electrical distortion on the first electrical data stream comprises compensating for the electrical distortion on the in-phase electrical data stream based on the quadrature phase electrical data stream, and
wherein compensating for the electrical distortion on the second electrical data stream comprises compensating for the electrical distortion on the quadrature phase electrical data stream based on the in-phase electrical data stream.

3. The method of claim 2, wherein the pair of the electrical data streams comprises a first pair of electrical data streams, the method further comprising:
compensating for the electrical distortion on a second pair of the electrical data streams together to recover the magnitude and phase information of the received optical signal.

4. The method of claim 3,
wherein the in-phase electrical data stream comprises a first in-phase electrical data stream, and the quadrature electrical data stream comprises a first quadrature electrical data stream,
wherein the second pair of electrical data streams comprises a second in-phase electrical data stream that represents a first aspect of the lightwave with the second polarization, and a second quadrature electrical data stream that represents a second aspect of the lightwave with the second polarization, and
wherein compensating for the electrical distortion on the second pair of the electrical data streams comprises compensating for the electrical distortion on the second in-phase electrical data stream based on the second quadrature phase electrical data stream, and compensating for the electrical distortion on the second quadrature phase electrical data stream based on the second in-phase electrical data stream.

5. The method of claim 1, wherein the received optical signal includes optical distortion, the method further comprising:
compensating for the optical distortion on the first electrical data stream based on the second electrical data stream; and compensating for the optical distortion on the second electrical data stream based on the first electrical data stream,
wherein recovering the magnitude and phase information of the received optical signal comprises recovering the magnitude and phase information of the received optical signal from the electrical distortion compensated and optical distortion compensated first and second electrical data streams.

6. The method of claim 1, wherein the plurality of electrical data streams comprises a first plurality of electrical data streams, the method further comprising:
receiving a second plurality of electrical data streams that are to be transmitted to the pluggable photonics module via the pluggable interface; and
pre-compensating on at least a pair of the second electrical data streams together to compensate for the electrical distortion that will be caused by at least the pluggable interface.

7. The method of claim 1, further comprising:
receiving information from the pluggable photonics module; and
determining an amount of compensation to be applied based on the received information,
wherein compensating for the electrical distortion of the first electrical data stream comprises compensating for the electrical distortion of the first electrical data stream based on the second electrical data stream and the determined amount of compensation, and
wherein compensating for the electrical distortion of the second electrical data stream comprises compensating for the electrical distortion of the second electrical data stream based on the first electrical data stream and the determined amount of compensation.

8. The method of claim 1, further comprising:
estimating an amount of the electrical distortion on the pair of the electrical data streams; and
determining an amount of compensation to be applied based the estimated amount of the electrical distortion on the pair of the electrical data streams,
wherein compensating for the electrical distortion of the first electrical data stream comprises compensating for the electrical distortion of the first electrical data stream based on the second electrical data stream and the determined amount of compensation, and
wherein compensating for the electrical distortion of the second electrical data stream comprises compensating for the electrical distortion of the second electrical data stream based on the first electrical data stream and the determined amount of compensation.

9. The method of claim 1, further comprising:
transmitting information to the pluggable photonics module to cause the pluggable photonics module to tune photonics of the pluggable photonics module.

10. The method of claim 1, further comprising:
transmitting information to the pluggable photonics module to cause the pluggable photonics module to adjust at least one of a power of a local oscillator within the pluggable photonics module, a frequency of the local oscillator within the pluggable photonics module, and an amplitude of one of electrical data streams output from a transimpedance amplifier (TIA) within the pluggable photonics module.

11. A processor comprising:
input units configured to receive, from a pluggable photonics module via a pluggable interface, a plurality of electrical data streams that together represent magnitude and phase information for a received optical signal in a coherent optical communication system, the electrical data streams having electrical distortion caused by the pluggable interface of the pluggable photonics module; and
a RX-equalizer configured to:
compensate for the electrical distortion on a first electrical data stream of a pair of the electrical data streams based on a second electrical data stream of the pair of the electrical data streams; and
compensate for the electrical distortion on the second electrical data stream of the pair of electrical data streams based on the first electrical data stream of the pair of the electrical data streams,
wherein the processor is configured to recover the magnitude and phase information of the received optical signal from the electrical distortion compensated first ad second electrical data streams.

12. The processor of claim 11,
wherein the received optical signal comprises a lightwave with a first polarization and a lightwave with a second polarization,
wherein the first electrical data stream comprises an in-phase electrical data stream that represents a first aspect of the lightwave with the first polarization,
wherein the second electrical data stream comprises a quadrature electrical data stream that represents a second aspect of the lightwave with the first polarization, and
wherein the RX-equalizer is configured to compensate for the electrical distortion on the in-phase electrical data stream based on the quadrature phase electrical data stream, and compensate for the electrical distortion on the quadrature phase electrical data stream based on the in-phase electrical data stream.

13. The processor of claim 12, wherein the pair of the electrical data streams comprises a first pair of the electrical data streams, and wherein the RX-equalizer comprises a first RX-equalizer, the processor further comprising:
a second RX-equalizer configured to compensate for the electrical distortion on a second pair of the electrical data streams together to recover the magnitude and phase information of the received optical signal.

14. The processor of claim 13,
wherein the in-phase electrical data stream comprises a first in-phase electrical data stream, and the quadrature electrical data stream comprises a first quadrature electrical data stream,
wherein the second pair of electrical data streams comprises a second in-phase electrical data stream that represents a first aspect of the lightwave with the second polarization, and a second quadrature electrical data stream that represents a second aspect of the lightwave with the second polarization, and
wherein the second RX-equalizer is configured to compensate for the electrical distortion on the second in-phase electrical data stream based on the second quadrature phase electrical data stream, and compensate for the electrical distortion on the second quadrature phase electrical data stream based on the second in-phase electrical data stream.

15. The processor of claim 11, wherein the received optical signal includes optical distortion, and wherein the RX-equalizer is configured to compensate for the optical distortion on the first electrical data stream based on the second electrical data stream, and compensate for the optical distortion on the second electrical data stream based on the first electrical data stream.

16. The processor of claim 11, wherein the plurality of electrical data streams comprises a first plurality of electrical data streams, the processor further comprising:
a TX-equalizer configured to receive a second plurality of electrical data streams that are to be transmitted to the pluggable photonics module via the pluggable interface, and pre-compensate on at least a pair of the second data streams together to compensate for the electrical distortion that will be caused by at least the pluggable interface.

17. The processor of claim 11, wherein the processor is configured to receive information from the pluggable photonics module, and determine an amount of compensation to be applied based on the received information, wherein the RX-equalizer is configured to compensate for the electrical distortion of the first electrical data stream based on the second electrical data stream and the determined amount of compensation, and wherein the RX-equalizer is configured to compensate for the electrical distortion of the second electrical data stream based on the first electrical data stream and the determined amount of compensation.

18. The processor of claim 11, wherein the processor is configured to estimate an amount of the electrical distortion on the pair of the electrical data streams, and determine an amount of compensation to be applied based the estimated amount of distortion on the pair of the electrical data streams, wherein the RX-equalizer is configured to compensate for the electrical distortion of the first electrical data stream based on the second electrical data stream and the determined amount of compensation, and wherein the RX-egualizer is configured to compensate for the electrical distortion of the second electrical data stream based on the first electrical data stream and the determined amount of compensation.

19. The processor of claim 11, wherein the processor is configured to transmit information to the pluggable photonics module to cause the pluggable photonics module to tune photonics of the pluggable photonics module.

20. The processor of claim 11, wherein the processor is configured to transmit information to the pluggable photonics module to cause the pluggable photonics module to adjust at least one of a power of a local oscillator within the pluggable photonics module, a frequency of the local oscillator within the pluggable photonics module, and an amplitude of one of the electrical data streams output by a transimpedance amplifier (TIA) within the pluggable photonics module.

21. A host board comprising:
a pluggable interface configured to selectively couple the host board to or decouple the host board from a pluggable photonics module and receive, from the pluggable photonics module, a plurality of electrical data streams that together represent magnitude and phase information for a received optical signal in a coherent optical communication system; and
a processor configured to:
compensate for electrical distortion on a first electrical data stream of a pair of the data streams based on a second electrical data stream of the pair of the data streams;
compensate for electrical distortion of the second electrical data stream of the pair of the data streams based on the first electrical data stream of the pair of the data streams; and
recover the magnitude and phase information of the received optical signal from the electrical distortion compensated first and second electrical data streams, wherein the electrical distortion is caused by at least the pluggable interface of the pluggable photonics module.

22. A method comprising:
receiving, with a pluggable photonics module, an optical signal in a coherent optical communication system;
receiving, with an interface on the pluggable photonics module, from a host board instructions to adjust at least one of a power of a local oscillator within the pluggable photonics module, a frequency of the local oscillator within the pluggable photonics module, and an amplitude of one of the electrical data streams output by a transimpedance amplifier (TIA) within the pluggable photonics module;
converting, with the pluggable photonics module, the optical signal into a plurality of electrical data streams that together represent magnitude and phase information of the received optical signal based on the adjustment to the at least one of the power of a local oscillator within the pluggable photonics module, the frequency of the local oscillator within the pluggable photonics module, and the amplitude of one of the electrical data streams output by the TIA within the pluggable photonics module; and
transmitting, with the pluggable photonics module, the plurality of the electrical data streams across a pluggable interface that allows selective coupling of the pluggable photonics module to and decoupling of the pluggable photonics module from a host board.

23. The method of claim 22, further comprising:
transmitting, with an interface on the pluggable photonics module, at least one of status information and configuration information to the host board; and
receiving, with the interface on the pluggable photonics module, from the host board instructions to tune photonics on the pluggable photonics module.

24. A pluggable photonics module comprising:
a pluggable interface configured to allow selective coupling and decoupling of the pluggable photonics module and a host board;
a local oscillator;
a transimpedance amplifier (TIA);
an interface configured to receive from the host board instructions to adjust at least one of a power of the local oscillator, a frequency of the local oscillator, and an amplitude of the TIA; and
photonics configured to:
receive an optical signal in a coherent optical communication system;
convert the optical signal into a plurality of electrical data streams that together represent magnitude and phase information of the received optical signal based on the adjustment to the at least one of the power of the local oscillator, the frequency of the local oscillator, and the amplitude of the TIA; and
transmit the plurality of the electrical data streams across the pluggable interface to the host board.

25. The pluggable photonics module of claim 24, further comprising an interface configured to transmit at least one of status information and configuration information to the host board, and receive from the host board instructions to tune photonics on the pluggable photonics module.

26. A network device comprising:
a pluggable photonics module; and
a host board,
wherein the pluggable photonics module comprises:

a first pluggable interface configured to allow selective coupling and decoupling of the pluggable photonics module and the host board; and photonics configured to:
- receive an optical signal in a coherent optical communication system;
- convert the optical signal into a plurality of electrical data streams that together represent magnitude and phase information of the received optical signal; and
- transmit the plurality of the electrical data streams across the pluggable interface to the host board, and wherein the host board comprises:
a second pluggable interface configured to selectively couple the host board to or decouple the host board from the pluggable photonics module and receive the plurality of the electrical data streams; and a processor configured to:
- compensate for electrical distortion on a first electrical data stream of a pair of the data streams based on a second electrical data stream of the pair of the data streams;
- compensate for electrical distortion of the second electrical data stream of the pair of the data streams based on the first electrical data stream of the pair of the data streams; and
- recover the magnitude and phase information of the received optical signal from the electrical distortion compensated first and second electrical data streams, wherein the electrical distortion is caused by at least the first and second pluggable interfaces.

* * * * *